Feb. 27, 1968         L. W. ROGERS         3,370,799

VARIABLE INTERMITTENT AND RESET DRIVE MECHANISM

Filed Jan. 10, 1966

INVENTOR.
LAWRENCE W. ROGERS

BY *Alexander Kozel*

AGENT

United States Patent Office 3,370,799
Patented Feb. 27, 1968

3,370,799
VARIABLE INTERMITTENT AND RESET DRIVE MECHANISM
Lawrence W. Rogers, Pensacola, Fla., assignor to Monsanto Company, St. Louis, Mo., a corporation of Delaware
Filed Jan. 10, 1966, Ser. No. 519,538
9 Claims. (Cl. 242—26.3)

ABSTRACT OF THE DISCLOSURE

A variable intermittent and reset drive mechanism including geared input and output members and a lever controlled to effect different gear connections to provide intermittent rotation of the output member in a forward direction and uninterrupted rotation in a reverse direction to reset the mechanism.

Figures 1, 2, 3:
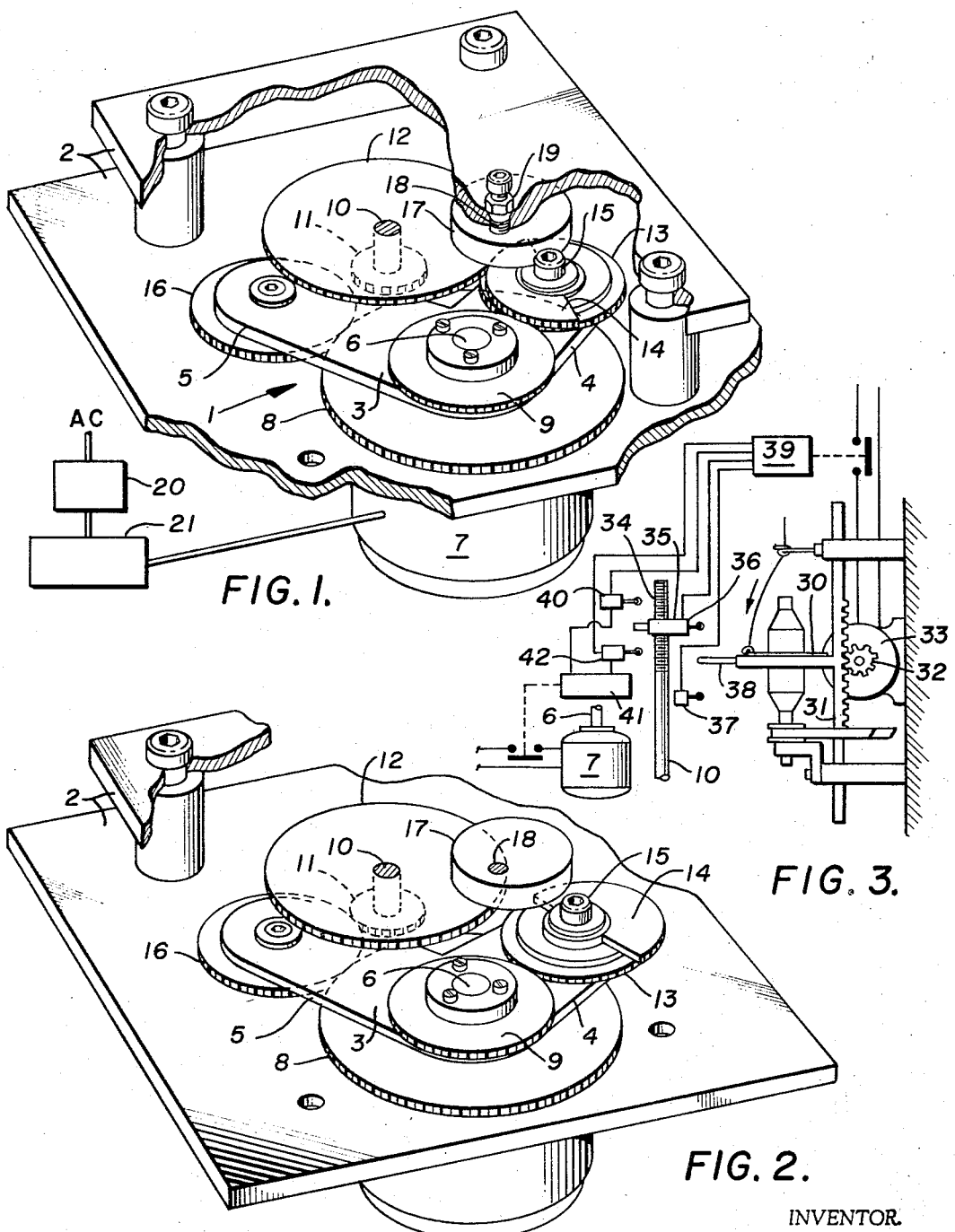

The drive mechanism is especially useful in applications requiring intermittent displacement of one or more elements at a predetermined rate and a resetting thereof at a comparatively rapid rate.

---

Intermittent drive mechanisms are employed in indexing devices, part manufacturing devices, textile machines and other related apparatus to perform kinematic operations. Present intermittent motion devices have limited variability and flexibility in operation and are expensive, complex and difficult to maintain.

It is an object of this invention to provide a kinematic mechanism capable of providing a wide range of variable intermittent motion.

Another object of the invention is to provide a reversible constant input mechanism providing sequential intermittent and reset motion operations.

Another object of the invention is to provide a variable intermittent motion mechanism simple in structure, inexpensive in cost, and readily maintainable.

A further object of the invention is to provide a drive mechanism adapted to sequentially drive a rotary member repeatedly in a chosen angle of intermittent rotation in one direction for displacing one or more elements connected to the rotary member and for driving the rotary member in another direction for rapidly resetting the one or more elements.

An embodiment of the novel variable intermittent and reset drive mechanism, in brief, comprises a pair of geared shafts, one an input or drive shaft adapted to be reversibly driven and the other an output or driven shaft adapted to be intermittently driven and to be reset. The geared output shaft is driven by the geared input shaft through a pivotal lever means mounted on the geared input shaft and a plurality of gears including an eccentric sector gear arranged on the lever means. Rotation of the input shaft in an assumed forward direction pivots the lever means for establishing a gear train that connects the input shaft to the output shaft for driving the latter intermittently in the forward direction while rotation of the input shaft in a reverse direction reverses the direction of rotation of the lever means resulting in formation of another gear train that connects the input shaft to the output shaft for driving the latter uninterruptedly in the reverse or reset direction. Control over the degree of intermittent angular rotation of the output shaft is provided by an adjustable limit means.

A better understanding of the invention will be gained by referring to the detailed description that follows and to the accompanying drawing.

In the drawing:
FIGURE 1 is a perspective view of the novel intermittent drive mechanism depicted in an intermittent drive or picking position,
FIGURE 2 is a perspective view of the same drive mechanism shown in a reset or reverse drive position, and
FIGURE 3 is a diagrammatic view illustratively showing the novel drive mechanism operating a yarn traverse device.

The variable intermittent and reset drive mechanism 1 embodying the invention is illustrated in the drawing, FIGS. 1 and 2, supported within mounting plates 2. In FIG. 3, drive mechanism 1 is shown controlling the operation of a textile apparatus.

Drive mechanism 1 comprises a pivotal lever 3 having connected angular arms 4 and 5. Lever 3 is pivotally mounted intermediate its ends thereof about an input or driver shaft 6 that is driven by a reversible drive motor 7.

Fixedly mounted on input shaft 6 at adjacent opposite lower and upper sides of lever 3 are gears 8 and 9, respectively. Lower gear 8 is a reverse drive gear and upper gear 9 is a forward drive gear. Gears 8 and 9 straddle lever 3 in juxtaposed, frictional, and sliding relation.

Positioned near the input shaft 6 is an output or driven shaft 10 journaled in plates 2. Fixedly mounted about output shaft 10 are lower and upper spaced gears 11 and 12, respectively. Lower gear 11 is a reset or reverse output gear and upper gear 12 is a forward output gear.

For clarity and simplicity reasons, rotation of shafts 6 and 10 and lever 3 in a counterclockwise direction, as viewed in FIGS. 1 and 2, is hereinafter referred to as the "forward" direction and rotation thereof in a clockwise direction is referred to as the "reset" or "reverse" direction.

To transfer rotational motion from input shaft 6 to output shaft 10 for driving the latter intermittently in the forward direction, a forward transfer gear 13 and a sector gear 14 are provided. Transfer gear 13 and sector gear 14 are journaled for rotation about a fixed pin 15 mounted adjacent the end of arm 4 of lever 3 and extending upwardly therefrom. Sector gear 14 is mounted in fixed relation on and above transfer gear 13 and is eccentrically mounted about pin 15. Transfer gear 13 is in constant meshing engagement with forward drive gear 9. To drive output shaft 10 in the reset direction, a reverse transfer gear 16 is rotatably mounted at the end of arm 5 of lever 3 at the lower side thereof. Reverse transfer gear 16 is in constant meshing engagement with reverse drive gear 8.

The degree, amount, or portion of tooth engagement of sector gear 14 with forward output gear 12 is selectably controlled by adjustment of a roll 17. Adjustment roll 17 is eccentrically mounted on the end of a threaded bolt 18 screw-threadedly supported in the upper mounting plate 2 and is positioned to lie in the arcial moving path of that portion of pin 15 extending above sector gear 14 so that pin 15 contacts roll 17 when lever 3 is rotated a predetermined degree in the forward direction.

Rotary adjustment of roll 17 varies the degree of rotation of lever 3 in the forward direction thereby controlling the degree of intermittent rotation of output shaft 10. Roll 17 is locked in position, after a predetermined adjustment is made, by a locking nut 19 as shown in FIG. 1. If variable intermittent motion is desired during operation, a handle, motor or the like may be connected to the bolt 18 and the latter then can be rotated during operation.

In operation, assume that an off-on switch 20 and a timer 21 are provided to turn on and sequentially reverse motor 7, respectively, and that motor 7 initially drives input shaft 6 in a forward direction. Gears 8 and 9 are then driven in a counterclockwise direction to frictionally clutch lever 3 and to rotate the latter in the forward direction. While lever is rotating, transfer gear 13 is driven in a clockwise direction by drive gear 9 and sector gear 14 being fixed to transfer gear 13 is rotatably carried by the latter in a clockwise direction.

When lever 3 reaches its forward limit position defined by pin 15 being carried by lever 3 into abutting contact with adjustment roll 17 or by sector gear 14 engaging with forward output gear 12 (depending on the position of sector gear 14) sector gear 14 will intermittently mesh with forward output gear 12 and by a repeated picking action cause intermittent rotation of output shaft 10. Because sector gear 14 is mounted on pivotal lever 3 that is oscillatable, any misalignment of the tooth engagement of sector gear 14, particularly at the instant of first engagement of the gear teeth, is rapidly corrected by small incremental oscillation of lever 3 that permits the gear teeth to become aligned. The degree of tooth and arcial contact of sector gear 14 with output gear 12 is controlled by the position of eccentric adjustment roll 17. Roll 17 is shown in FIGS. 1 and 2 adjusted to effect a large degree of segmental contact of sector gear 14 with forward output gear 12.

Assume, after a timed period of intermittent or picking operation, motor 7 reverses direction of rotation. Input shaft 6 is then driven in a reverse or reset direction thereby rotating reverse and forward drive gears 8 and 9 in a clockwise direction. Since reverse transfer gear 16 is in constant meshing engagement with reverse drive gear 8, gear 16 is driven in a counterclockwise direction. The frictional contact between gears 8 and 9 and lever 3 effects a clutching action therebetween causing lever 3 to rotate in a clockwise direction carrying sector gear 14 out of its intermittent picking position. Lever 3 is rotated in a clockwise direction until reverse transfer gear 16 is carried into meshing engagement with reverse output gear 11, thus limiting further movement of lever 3. Reverse transfer gear 16 then drives reverse output gear 11 in a clockwise direction driving output shaft 10 in a clockwise, reverse, or reset direction.

Drive mechanism 1 is particularly adapted in applications requiring displacement of one or more control members for performing sequential mechanical and electrical movements. For example, the reciprocating pattern of a traverse device in a textile yarn winding operation is readily controlled by drive mechanism 1.

Conventionally, in one type of textile winding apparatus, a bobbin is mounted on and driven by a spindle while yarn is applied to and traversed across the face of the bobbin by use of a traverse ring and a traveler member mounted to orbit around the ring. The traverse ring is concentrically positioned in relation to the bobbin and is reciprocated up and down along the length thereof. In order to form different yarn package configurations, it is necessary to program the movement of the traverse ring.

A diagrammatic view of the association of drive mechanism 1 with a textile winding apparatus is illustrated in FIG. 3. A traverse ring 30 is connected to one end of a geared rack 31 which is reciprocated up and down by a pinion gear 32 that meshes with geared rack 31 and is driven by a reversible motor 33.

The reciprocating pattern of traverse ring 30 may be controlled by providing a threaded portion 34 on output shaft 10, mounting a collar 35 having a threaded bore in screw-thread relation on threaded portion 34 and supporting a microswitch 36 on the collar 35. Another microswitch 37 is fixedly supported on the output shaft 10 or near thereto in spaced distance below threaded portion 34. An arm or extension 38 is provided on traverse ring 30 and arm 38 extends within the space between microswitches 36 and 37. Microswitches 36 and 37 are connected to a relay 39 connected in turn to reversible motor 33.

In operation of the textile apparatus, assume that a predetermined adjustment of roll 17 is made to provide a preselected degree of intermittent rotation of shaft 10 and that motor 7 is energized to drive input shaft 6 in a forward direction to effect intermittent picking of output shaft 10 in the mode of operation explained.

Assume that initially reversible motor 33 is energized for driving rack 31 downward. Rack 32 will descend to a point where arm 38 is carried into engagement with microswitch 37. Microswitch 37 reverses the direction of motor 33 causing pinion gear 32 to drive rack 31 upward. Meanwhile, output shaft 10 is being intermittently driven displacing collar 35 downward (right-hand thread on output shaft 10) closing the distance or gap between microswitches 36 and 37 while arm 38 of traverse ring 30 is carried upward into engagement with microswitch 36. Motor 33 then reverses and drives traverse ring 30 downward.

After a period of operation, collar 35 will be displaced to a lower limit position (corresponding to a time when a bobbin is fully packaged with yarn) where contact is made with a microswitch 42 mounted fixedly on output shaft 10 or close thereto. Microswitch 42 is connected to motor 7 through a relay 41 and to motor 33 through relay 39 and when contacted causes motor 7 to reverse rotation and motor 33 to shut-down. As explained, with motor 7 being reversed, input shaft 6 will be driven in a clockwise or reverse direction and output shaft 10 will be driven in a clockwise direction. With output shaft 10 rotating in a clockwise direction collar 35 is rapidly driven upward and reset in its uppermost position. A microswitch 40 can be mounted on output shaft 10 or near thereto above collar 35 so that when collar 35 reaches its uppermost position contact is made with microswitch 40 and the latter signals motor 7 to drive input shaft 6 in the forward direction and motor 36 to drive rack 31.

It will be understood that the yarn textile operation and apparatus as illustrated is oversimplified and incomplete with only the essential components shown for purposes of ease of understanding.

The intermittent and reset drive mechanism 1 is particularly adapted for textile applications because of the ready adjustment that can be made to provide a wide range of intermittent angular rotation of output shaft 10. With a wide range of adjustment it is possible to wind yarn packages of different yarn deniers requiring different programmed traversal of yarn. The rapid reset feature is a time saving step.

It will be understood that modifications and variations are contemplated within the spirit of the invention and that limitations are expected only within the scope of the following claims.

I claim:
1. An intermittent drive mechanism comprising,
   a. geared driver means,
   b. driving means adapted to reversibly drive said geared driver means in a forward and reverse direction,
   c. geared driven means,
   d. lever means pivotally mounted intermediate its ends thereof about said geared driver means, said lever means arranged to be frictionally clutched by said geared driver means,
   e. a first gear means, including a sector gear, rotatably mounted adjacent one end of said lever means and having constant meshing engagement with said geared driver means,
   f. a second gear means rotatably mounted adjacent the other end of said lever means, said second gear means being in constant meshing engagement with said geared driver means,
   g. limit means for controlling the degree of rotation of said lever means in said forward direction,
   h. wherein, when said geared driver means is driven in said forward direction by said driving means said geared driver means frictionally clutches said lever means and rotates the latter in said forward direction to a degree defined by said limit means for establishing a gear train of said geared driver means, said first means and said geared driven means to effect intermittent rotation of said geared driven means in said forward direction; and, when said geared driver means is driven in said reverse direction said geared driver means frictionally clutches said lever means and rotates the latter in said reverse direction to establish another gear train of said geared driver means, said second gear means, and said geared driven means to effect uninterrupted rotation of said geared means in said reverse direction.

2. An intermittent drive mechanism as in claim 1, wherein, said limit means is adjustable for variably controlling the degree of rotation of said lever means in said forward direction.

3. An intermittent drive mechanism as in claim 2, wherein, said sector gear is eccentrically mounted.

4. An intermittent drive mechanism as in claim 1, wherein, said lever means is angular.

5. An intermittent drive mechanism as in claim 1, wherein, said geared driver means comprises a shaft having a pair of spaced gears affixed thereto and said lever means is pivotally mounted on said shaft between said gears in slidable and frictional relation therewith.

6. An intermittent drive mechanism as in claim 1, further comprising control means movably mounted on said geared driven means, said control means being displaced responsively to intermittent rotation of said geared driven means in said forward direction and being reset responsively to rotation of said geared driven means in said reverse direction.

7. An intermittent drive mechanism comprising,
 a. a geared driver means,
 b. driving means for driving said geared driver means in forward and reverse directions,
 c. geared driven means,
 d. pivotal lever means mounted on said geared driver means, said pivotal lever means being adapted to be clutched by said driver means,
 e. gear means including an eccentrically mounted sector gear rotatably mounted on said pivotal lever means for connecting said geared driver means to drive said gear driven means intermittently in said forward dircetion and uninterruptedly in said reverse direction, and
 f. limit means for controlling the degree of pivotal rotation of said pivotal lever means.

8. An intermittent drive mechanism as in claim 7, comprising adjustable limit means for variably controlling the degree of pivotal rotation of said pivotal lever means.

9. In a textile yarn winder apparatus including a driven spindle adapted to carry a bobbin, a traverse means for guiding a yarn back and forth across the face of the bobbin, and a means for reversibly displacing said traverse means, the improvement therein of an intermittent drive mechanism for controlling the traversal pattern of said traverse means, said intermittent drive mechanism comprising,
 a. geared driver means,
 b. driving means adapted to reversibly drive said geared driver means in a forward and reverse direction,
 c. geared driven means,
 d. lever means pivotally mounted intermediate its ends thereof about said geared driver means and arranged to be frictionally clutched by said latter means,
 e. a pair of gear members including one gear member rotatably mounted adjacent one end of said lever means and arranged to be in constant meshing engagement with said geared driver means, and another eccentrically positioned sector gear member carried by said one gear member for engaging with said geared driven means to drive the latter intermittently when said driver means is driven in said forward direction,
 f. a separate gear member rotatably mounted adjacent the other end of said lever means and arranged to be in constant meshing engagement with said geared driver means and to be engageable with said gear driven means to drive the latter uninterruptedly in said reverse direction when said driver means is driven in said reverse direction,
 g. adjustable limit means for variably controlling the degree of rotation of said lever means in said forward direction,
 h. control means movably mounted on said geared driven means, said control means being intermittently displaced in one direction on said geared driven means responsively to said geared driver means being driven in said forward direction and being reset responsively to said geared driver means being driven in said reverse direction,
 i. a pair of spaced switch means, one being mounted on said control means and both being connected to said means for reversibly displacing said traverse means,
 j. said traverse means being positioned to alternately contact said pair of spaced switch means while being reversibly displaced to produce a variable rate of traversal as programmed by said movable control means.

References Cited
UNITED STATES PATENTS

| 2,749,055 | 6/1956 | Bauer | 242—26.2 |
| 3,042,326 | 7/1962 | Lamb et al. | 242—26.3 |
| 3,103,122 | 9/1963 | Reichelt | 74—810 X |
| 3,130,930 | 4/1964 | Miller | 242—26.3 |
| 3,169,714 | 2/1965 | Schippers. | |
| 3,241,385 | 3/1966 | Tomaro | 74—810 X |

STANLEY N. GILREATH, *Primary Examiner.*